United States Patent [19]
Beck et al.

[11] Patent Number: 5,997,078
[45] Date of Patent: Dec. 7, 1999

[54] INSTRUMENT PANEL FOR A MOTOR VEHICLE

[75] Inventors: Oliver Beck, Sindelfingen; Herbert Damsohn, Aichwald-Aichelberg; Markus Flik; Michael Foerster, both of Stuttgart; Walter Wolf, Oppenweiler-Zell, all of Germany

[73] Assignee: Behr GmbH & Co., Stuttgart, Germany

[21] Appl. No.: 08/862,412

[22] Filed: May 23, 1997

[30] Foreign Application Priority Data

May 24, 1996 [DE] Germany ............................ 196 20 919

[51] Int. Cl.⁶ ................................................... B62D 25/14
[52] U.S. Cl. ............................. 296/208; 296/70; 180/90; 454/161
[58] Field of Search ............................ 296/70, 192, 208, 296/901; 454/127, 152, 156, 160, 161; 180/90

[56] References Cited

U.S. PATENT DOCUMENTS 4,733,739  3/1988  Lorenz et al. ............................ 180/90

FOREIGN PATENT DOCUMENTS

| 0 713 798 | 5/1996 | European Pat. Off. . |
| 34 47 185 | 4/1991 | Germany . |
| 44 23 108 | 1/1995 | Germany . |
| 195 35 263 | 4/1996 | Germany . |
| 62-146733 | 6/1987 | Japan . |
| 63-2741 | 1/1988 | Japan . |

*Primary Examiner*—Andrew C. Pike
*Attorney, Agent, or Firm*—Foley & Lardner

[57] ABSTRACT

An instrument panel for a motor vehicle comprises structural parts that, with the exception of the space required for the components of an air temperature conditioning system including at least one of a heater and an air conditioner, virtually completely fill the interior of the instrument panel. The structural parts are shaped to form air duct.

14 Claims, 4 Drawing Sheets

INSTRUMENT PANEL FOR A MOTOR VEHICLE

BACKGROUND OF THE INVENTION

The present invention relates to an instrument panel for a motor vehicle. Eurpean Patent 0 185 856 B1 discloses an instrument panel for a motor vehicle, having two structural parts which each have integrally formed walls for receiving components of an air-conditioning or heating system. The disadvantage with this known instrument panel is that, in order to receive an air-conditioning or heating system, it is necessary to integrally form an appropriate air-conditioning-system housing or heating-system housing on one of the structural parts. The walls required for forming these housings are of relatively thin design and complex assembly.

SUMMARY OF THE INVENTION

One object of the invention is to provide an instrument panel such that an air-conditioning or heating system can be integrated in the instrument panel in a simple manner, and provide sufficient bending strength of the instrument panel.

A further object of the invention is to provide an instrument panel in which a plurality of passageways can be formed in the panel in a simple and efficient manner.

In accomplishing these and other objects of the invention, there has been provided an instrument panel for a motor vehicle, this instrument panel being capable of containing one or more components of a heating and/or air-conditioning system, the instrument panel comprising a plurality of structural parts comprising a first structural part of foamed synthetic resin and a second structural part of foamed synthetic resin. The second structural part is positioned contiguous to the first structural part so as to define therebetween at least one void space serving as a holder for one of the components and/or a passageway for the system. The plurality of structural parts substantially occupy the entire interior volume of the instrument panel outside the void space.

Further objects, features, and advantages of the invention will become apparent from the detailed description of the invention which follows, when considered together with the attached figures of drawing.

DETAILED DESCRIPTION OF PREFERRED EMBODIMENTS

An advantage achieved by the invention, because the structural parts have thick walls, is that those areas of the interior of the instrument panel which are not used are filled virtually completely. This provides the instrument panel with increased bending strength in the transverse and longitudinal directions. At the same time, designing the instrument panel as a solid block effectively reduces the propagation of structure-borne sound and airborne sound. Since the air ducts have thick walls, damping of airborne sound and structure-borne sound is achieved at the origin of the sound. Furthermore, the number of components necessary for an air-conditioning or heating system inserted into the present instrument panel is reduced by shaping the structural parts so as to contain or define tubular recesses which serve as air ducts. Consequently, no additional air hoses must be inserted into recesses provided especially therefor. Furthermore, the inside of at least one structural part is shaped to retain the component(s) of an air-conditioning or heating system, for example, a heating device or an evaporator, without any additional structural parts, such as a housing for the heating or air-conditioning system. This makes it easy to insert the components in the correct position. Since the structural parts are designed as flexible foam moldings, it is possible to achieve any shape or any cross section for the air ducts. By providing a plurality of structural parts, it is possible to form a plurality of air ducts, arranged one above the other, running in different directions. As a result, the instrument panel may provide space-saving advantages.

According to one embodiment of the invention, the structural parts are formed from an expanded polypropylene (EPP). This makes it possible for the degree of mechanical strength to be selected, depending on requirements, during the production process of the structural parts. Furthermore, this material permits the structural parts to be recycled.

According to another embodiment of the present invention, the blower of a heating or air-conditioning system is located within the instrument panel, on the passenger side. Additional components, e.g., the heating device and the evaporator, are located in a central region of the instrument panel, in an extension of the center console. In this manner, a normally unused area within the instrument panel receives the components, thus creating additional space in the footwell beneath the instrument panel.

Figure 1:
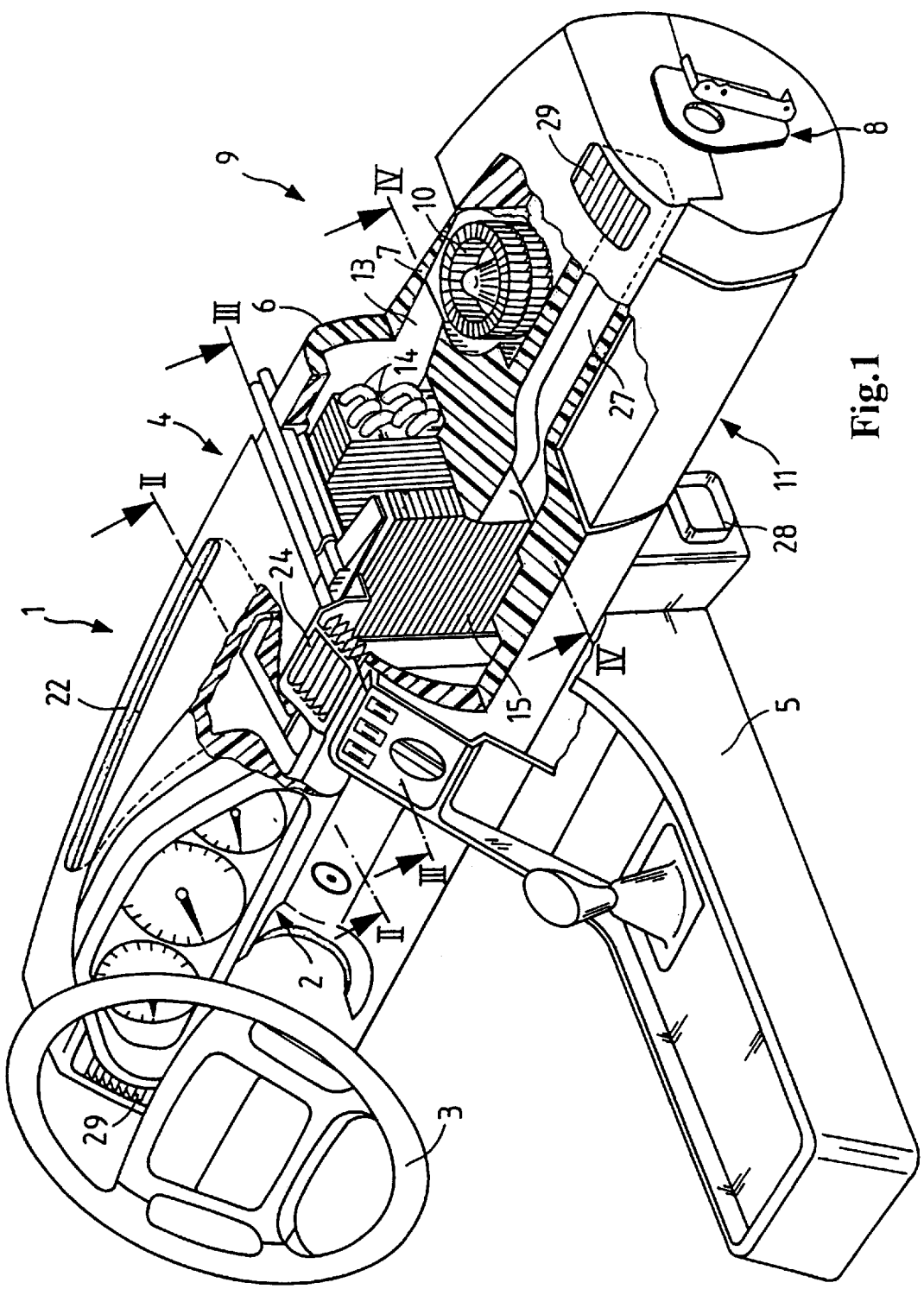
FIG. 1 is a perspective illustration of an instrument panel according to the present invention, which is cut open on the passenger side.
Figure 2:
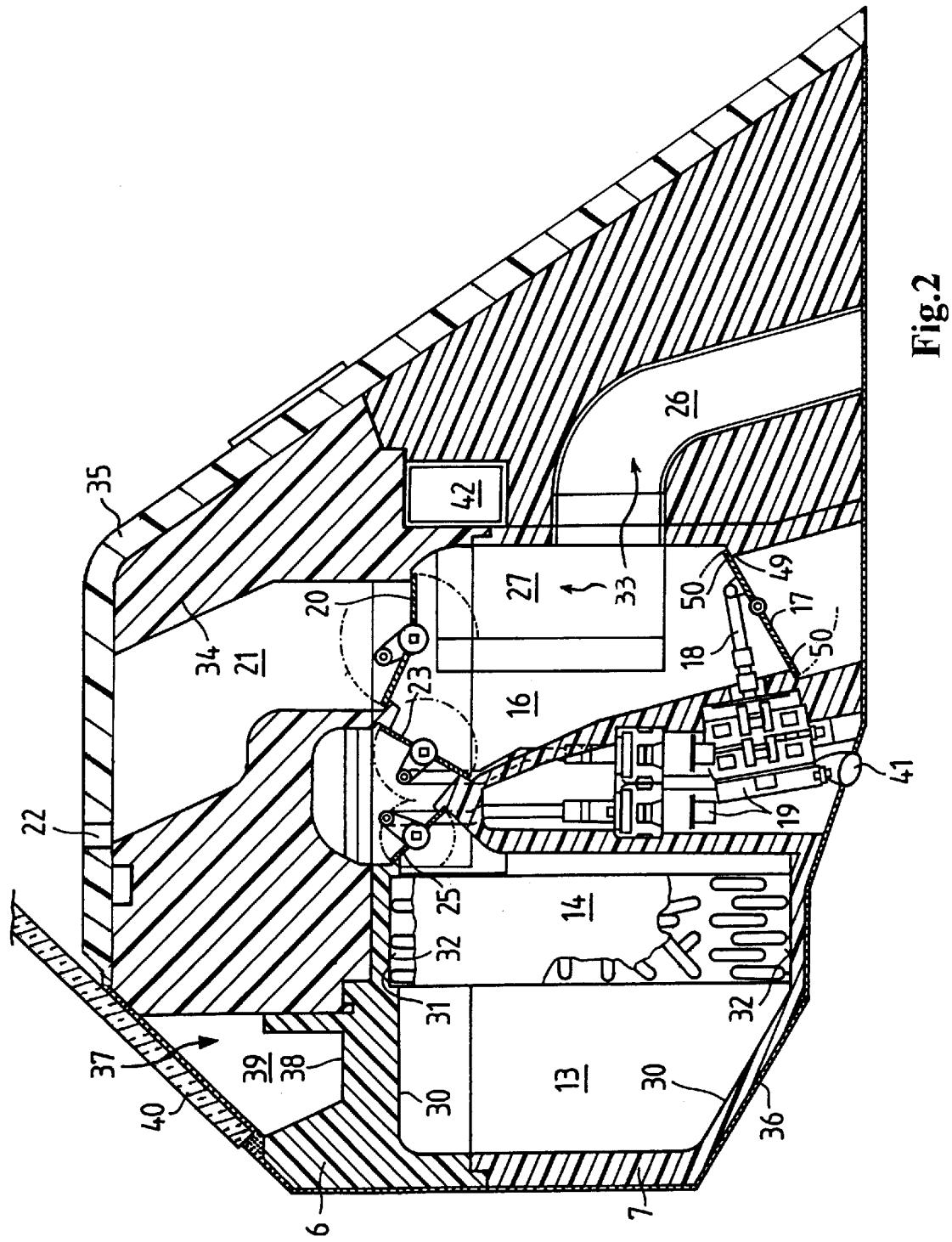
FIG. 2 is a cross section view along line II—II through the instrument panel according to FIG. 1.

An instrument panel or dashboard 1 installed in a motor vehicle is illustrated in FIG. 1. The instrument panel receives a gauge set 2 and a steering-wheel column connected to a steering wheel 3. In a central region 4, the instrument panel 1 is connected to a center console 5.

The instrument panel 1 has two structural parts, a top structural part 6 and a bottom structural part 7, which extend from between the side walls (not illustrated) of the motor vehicle. The structural parts are connected to the side walls with frictionally locking connecting elements 8.

Figure 4:
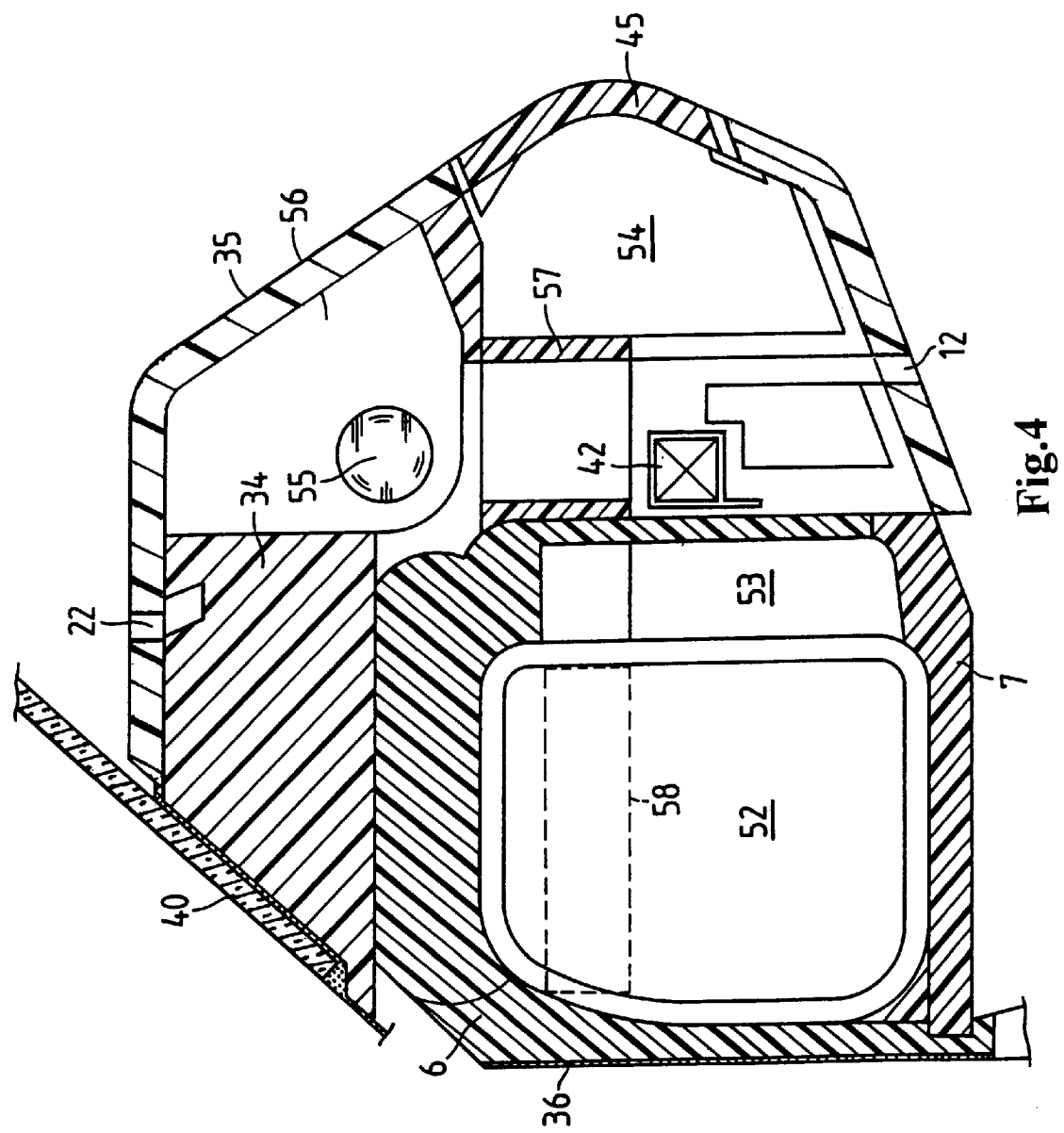
FIG. 4 is a cross section view along line IV—IV through the instrument panel according to FIG. 1.

An air-conditioning system 9 is accommodated in the instrument panel 1. The structural parts 6, 7 each have recesses into which the components of the air-conditioning system 9 are introduced and retained in a positive and frictionally locking manner, preferably by a press-fit. A blower 10 is arranged on a passenger side 11 and, depending on the position of a recirculating-air and fresh-air damper (not illustrated), takes in fresh air and/or recirculates air from the vehicle interior through a recirculating-air intake 12 (FIG. 4). Alternatively, the blower 10 may be arranged in the central region 4 so that the heating or air-conditioning system is arranged essentially symmetrically in the instrument panel 1.

The air which has been taken in is fed, via an air duct 13, to an evaporator 14, is cooled thereby, and is then directed to a heating device 15. After the air has passed through the heating device 15, the temperature-controlled air passes into an air-distributing passageway 16 in which the air is distributed to various nozzles. To control the airstream in the direction of the footwell, a footwell via duct 28 controlling damper 17 is provided in the air-distributing passageway 16 and is connected to an actuating element 19 via a lever mechanism 18. This actuating element 19 is a vacuum unit. Alternatively, the footwell controlling damper 17 may also be adjusted by an electric motor. Further actuating elements 19 are provided for a defroster damper 20 to control the quantity of air passing through a defroster air duct 21 to the defroster nozzles 22. A central nozzle damper 23 adjusts the quantity of air which is directed to a central nozzle 24 via an air duct (not illustrated). A mixer damper 25 is arranged in the region of the evaporator 14 for diverting air which is cooled by the evaporator 14, via a bypass duct (not illustrated), around the heating device 15 and directly into the air-distributing passageway 16. Furthermore, a rear-passenger-compartment air duct 26 and a side-nozzle air duct 27 branch off from the air-distributing passageway 16 and lead respectively to a rear-passenger-compartment outlet and to laterally arranged side nozzles 29.

Figure 3:
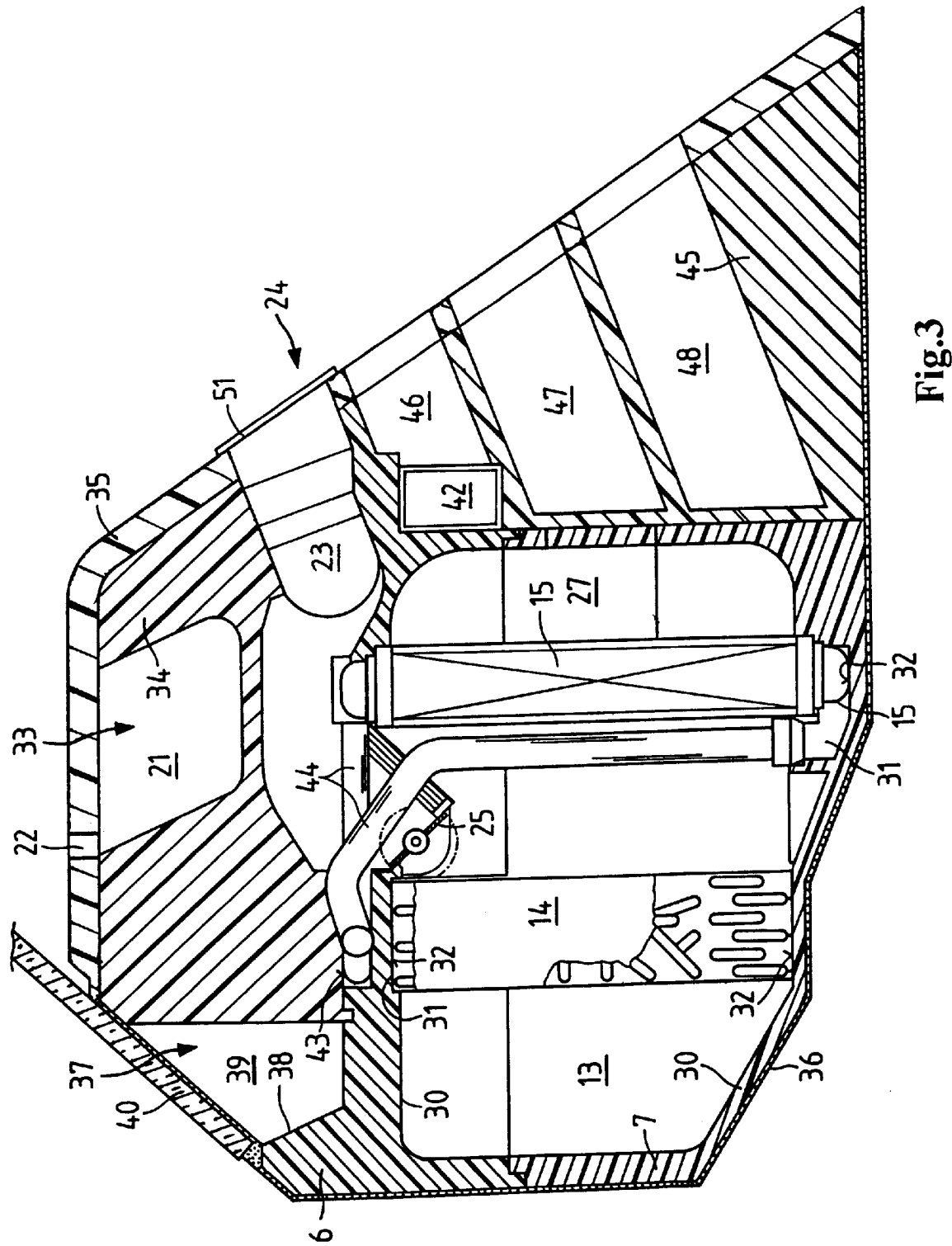
FIG. 3 is a cross section view along line III—III through the instrument panel according to FIG. 1.

As shown in FIGS. 3 and 4, the components of the air-conditioning system 9 are retained and/or formed by the two structural parts 6 and 7. The blower 10, the evaporator 14, and the heating device 15 are received in depressions 31 on the inside surface 30 of the top structural part 6 and the bottom structural part 7. The border-side walls 32 of the components are inserted into the depressions 31 and rest flatly thereagainst. The structural parts 6 and 7 consist of a foamed plastic with a density such that a certain compensation of tolerances can take place when the components are clamped in the depressions 31. The structural parts 6 and 7 consist of a dimensionally stable, interior-filling material. Furthermore, the structural parts 6 and 7 have recesses 33 forming the air ducts 21, 26, 27. The structural parts 6 and 7 are produced in appropriately designed molds as flexible foam moldings, and preferably are made of an expanded polypropylene foam, for example, of a Fawo-Cel foam manufactured by Fagerdala World Foams. Furthermore, they may also consist of a polyester foam, a polyethlene foam, or a polyurethane foam.

Arranged above the top structural part 6 is a covering structural part 34 made of the same material. Since the covering structural part 34 has more of a filling function than a load-bearing function, it has a relatively low density to provide an impact-absorbing effect in the event of an accident. The risk of injury to the passenger can thus be reduced.

The structural parts 6 and 34 are connected to an outer skin 35, which is applied flatly on the outside of the structural parts 6 and 34 and is connected mechanically or by adhesive bonding. The outer skin 35 may comprise a plurality of layers of the same plastic of different densities and a covering applied to the outside. For example, it may comprise a thin plastic layer of relatively high density, a plastic layer of lower density arranged on top of this, and a covering formed in accordance with aesthetic aspects.

The structural parts 6 and 7 are connected to the rear of bulkhead or firewall 36 in a clamping manner and/or by mechanical connecting means or by adhesive bonding.

To assemble the instrument panel 1, the appropriate components, e.g., the evaporator 14, the heating device 15, or the actuating elements 19, are inserted into the appropriate depressions 31 in the bottom structural part 7. After this, the other structural parts 6, 34 are placed in position. The structural parts 6, 7, 34 are held together by the press-fit of the inserted components. In addition, the assembled structural parts 6, 7, 34 may be retained by clamping. Assembly of the instrument panel 1 is completed by applying the outer skin 35 and fastening the structural parts 6, 7 to the bulkhead 36. In addition to retaining the components, the solid design of the structural parts forming the instrument panel and the resulting airtight enclosure of the components by the flexible foamed plastic thermally insulate the components. This results in improved efficiency, particularly for the expansion valve (not illustrated).

The top structural part 6 has, on a top side 37, a recess 38 forming a cable passageway 39 beneath a windshield 40. Cable passageway 39 extends along the instrument panel 1 and guides electric cables which extend from the engine compartment to the gauge set 2. Downstream of the evaporator 14, an opening 41 is provided in the bottom structural part 7 for any condensation to flow through.

Between the bottom structural part 7 and the covering structural part 34, a carrying tube 42 extends along the instrument panel 1. Carrying tube 42 has retaining means in the region of gauge set 2, for supporting the gauge set 2, and has retaining means in the central region 4, for supporting the heating or air-conditioning system.

The covering structural part 34 has a recess 43 to positively retain heating pipes 44 which channel coolant to and from the heating device 15. In the central region 4, the structural parts 6 and 7 are adjoined by a front structural part 45 which has a plurality of fan-like recesses 46, 47, 48. The top recess 46 receives an operating panel for the air-conditioning system, the central recess 47 receives a radio unit, and the bottom recess 48 receives a cassette player or a CD player.

The structural parts 6, 7, and 34 are shaped such that the air ducts 21, 26, 27 which lead to the corresponding nozzles are sized in accordance with requirements of the individual air ducts as regards air quantity and avoiding a pressure drop. Furthermore, the air dampers 20, 23, 25 do not require any peripheral seals because the air ducts have shoulders 49 which the periphery 50 of the air dampers rest against in the closed position. In the outlet regions of the air ducts, the nozzles can be inserted into the opening as a nozzle unit. As illustrated in FIG. 3, a central nozzle unit 51 is inserted into the opening of the central nozzle duct 24 and is connected to the structural parts 6 and 34 preferably by frictional clamping. The air ducts 21, 26, 27 have thick walls formed by the structural parts 6, 7, 34, so that in addition to the compact construction of the instrument panel 1, the propagation of structure-borne sound is reduced.

An activated-carbon filter 52 is frictionally retained within the cavity formed by the structural parts 6 and 7. Activated-carbon filter 52 is arranged between the blower 10 and the evaporator 14, and filters out the volatile substances present in the air. The activated-carbon filter 52 is arranged within the air duct 13. An air damper (not illustrated) arranged in front of the activated-carbon filter 52 diverts the airstream around the activated-carbon filter 52, through a bypass duct 53, so that the activated-carbon filter 52 is bypassed. To exchange the activated-carbon filter 52, the bottom structural part 7 is designed to be removable. The bottom structural part 7 may be connected to the top structural part 6 by a hinge so that the bottom structural part 7 can be pivoted downwardly in the manner of a flap. Furthermore, a glove compartment 54 and an airbag 55 located above glove compartment 54 are arranged in the front region of the instrument panel 1. The front structural part 34 has a recess 56 for receiving the airbag 55. The glove compartment 54 is retained such that it can be swung downwardly. In the open position, an insert piece 57 can be withdrawn to provide access to a particle filter 58 arranged upstream of the activated-carbon filter 52. Once its useful service life has elapsed, the particle filter 58 can easily be withdrawn through the opening in the glove compartment 54 and replaced by a new one.

While the invention has been described and disclosed with reference to certain preferred embodiments, it is to be understood that various modifications to the embodiments are possible. Thus, the full scope of the invention is to be determined with reference to the attached claims.

What is claimed is:

1. An instrument panel for a motor vehicle, said instrument panel being capable of containing at least one component of an air temperature conditioning system that includes at least one of a heater and an air conditioner, the instrument panel comprising:
   a plurality of structural parts comprising
      a first foamed synthetic resin structural part including at least one first recess, and
      a second foamed synthetic resin structural part including at least one second recess, said second structural part being contiguously positioned and matingly engaged with said first structural part, and
   at least one void space defined by said first and second recesses, said at least one void space providing a holder that is adapted to fix, in a form-fitting manner, the at least one component,
   wherein said plurality of structural parts are adapted to substantially occupy an entire interior volume of the instrument panel outside said at least one void space.

2. An instrument panel according to claim 1, including a plurality of said void spaces, with at least one of said plurality of void spaces adapted to provide an air passageway for the system.

3. An instrument panel according to claim 1, wherein said first structural part and said second structural part comprise foamed plastic moldings.

4. An instrument panel according to claim 3, wherein said first structural part and said second structural part comprise an expanded polypropylene.

5. An instrument panel according to claim 3, wherein said foam plastic moldings are adapted to frictionally retain and seal the at least one component with respect to said first structural part and said second structural part.

6. An instrument panel according to claim 5, wherein press-fitting is adapted to retain the at least one component in said at least one void space.

7. An instrument panel according to claim 1, wherein said at least one void space is adapted to fix all components of the system with respect to the motor vehicle.

8. An instrument panel according to claim 7, wherein said at least one void space is adapted to fix an evaporator with respect to the motor vehicle.

9. An instrument panel according to claim 7, wherein said at least one void space is adapted to fix a heating device with respect to the motor vehicle.

10. An instrument panel according to claim 7, wherein said at least one void space is adapted to fix a blower on a passenger side of the motor vehicle, and is adapted to fix an evaporator and a heating device generally at a center of the motor vehicle.

11. An instrument panel according to claim 1, further comprising:
   a third structural part overlaying one of said first and second structural parts;
   wherein said third structural part has a relatively lower density with respect to said first and second structural parts.

12. An instrument panel according to claim 11, further comprising:
   a decorative skin covering an exterior of at least one of said first structural part, said second structural part, and said third structural part.

13. An instrument panel according to claim 11, wherein said first structural part, said second structural part, and said third structural part are connected to one another by at least one of adhesive bonding and clamping.

14. An instrument panel according to claim 1, wherein said at least one void space is adapted to provide an air passageway for the system.

* * * * *